(12) United States Patent
Saperstein et al.

(10) Patent No.: US 12,483,574 B1
(45) Date of Patent: Nov. 25, 2025

(54) SYSTEM AND METHOD OF IDENTIFYING MALICIOUS ACTIVITY IN A NETWORK

(71) Applicant: Massachusetts Mutual Life Insurance Company, Springfield, MA (US)

(72) Inventors: Sara Saperstein, Springfield, MA (US); John H. Ring, IV, Springfield, MA (US); Kevin Sopuch, Springfield, MA (US); James Hefferman, Springfield, MA (US); Lindsey Basara, Springfield, MA (US); Evan Moore, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 201 days.

(21) Appl. No.: 18/344,640

(22) Filed: Jun. 29, 2023

Related U.S. Application Data

(60) Provisional application No. 63/356,836, filed on Jun. 29, 2022.

(51) Int. Cl.
*G06N 20/00* (2019.01)
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 10,911,477 B1* | 2/2021 | Kharraz | G06F 16/90344 |
| 2020/0021607 A1* | 1/2020 | Muddu | G06F 3/04842 |
| 2020/0027089 A1* | 1/2020 | Kuchar | H04L 9/0637 |
| 2020/0356676 A1* | 11/2020 | Gorlamandala | G06F 21/577 |
| 2021/0126938 A1* | 4/2021 | Trost | G06F 21/552 |
| 2021/0136089 A1* | 5/2021 | Costea | H04L 63/1466 |
| 2022/0027916 A1* | 1/2022 | Abreu | G06Q 20/405 |
| 2023/0308464 A1* | 9/2023 | Dong | H04L 63/1416 |
| 2024/0073241 A1* | 2/2024 | Beard | H04L 63/1416 |

* cited by examiner

*Primary Examiner* — Christopher B Robinson
(74) *Attorney, Agent, or Firm* — Foley & Lardner LLP

(57) ABSTRACT

Disclosed herein are methods and systems for identifying malicious network activity. In an embodiment, a method comprises monitoring, by a computer, network activity of a user having a baseline network activity; executing, by the computer, a machine learning model to determine a network activity score indicating a likelihood of the network activity being malicious activity for the baseline network activity, the machine learning model having been previously trained based on malicious activity and corresponding baseline network activity; and displaying, by the computer, the network activity score.

18 Claims, 6 Drawing Sheets

SYSTEM AND METHOD OF IDENTIFYING MALICIOUS ACTIVITY IN A NETWORK

CROSS-REFERENCE TO RELATED APPLICATIONS

This application claims priority to U.S. Provisional Application No. 63/356,836, filed Jun. 29, 2022, which is incorporated herein by reference in its entirety for all purposes.

TECHNICAL FIELD

This application is generally directed towards a malicious activity identification system, and more specifically towards systems and methods for identifying malicious activity in a network.

BACKGROUND

Most individuals and/or corporations attempt to secure data in a network by configuring defenses designed to eliminate the likelihood of an unauthorized user accessing the network. For example, firewalls and authorization credentials are tactics used to regulate user access in a network. Such defenses are somewhat successful in preventing unauthorized users in the network and/or regulating the users using the network.

Malicious activity includes activity performed to breach the defenses of the network. For example, a hacker may learn a layout (or topology) of the network before executing a security breach. Malicious activity includes external sources penetrating a system without authorization. For example, a hacker may enter a system and/or hijack an account in a system without authorization. Malicious activity can also include internal sources accessing content without authorization. For example, a user with a valid account may access particular data without authorization, replicate the accessed data, and/or disperse the accessed data without authorization. Generally, malicious activity compromises/impairs the confidentiality, integrity, and/or availability of data and/or resources in the network.

There is a need to identify malicious activity occurring in the network to prevent or reduce the amount of damage/inconvenience faced by individuals and/or corporations when the security of the network is breached. Malicious activity can be identified by one or more characteristics of malicious activity. The characteristics of malicious activity are broad and numerous because there are many ways that a network can be penetrated (e.g., phishing scams, Trojan code). In addition, the characteristics of malicious activity may also be characteristics of regular user activity. In a first example, a characteristic of malicious activity (e.g., downloading large quantities of data) may also be a characteristic of an authorized user (e.g., receiving a new laptop and needing to transfer their data). In a second example, a characteristic of malicious activity (e.g., traversing unusual paths in a command line to access files) may be a characteristic of a hacker (e.g., an unauthorized user) learning about the network/planning an attack or a characteristic of an authorized developer or another user who accesses files using various/unusual file paths.

In some conventional approaches, one or more personnel trained to identify malicious activity in a network may monitor the network. In other systems, malicious activity is identified by determining an acceptable deviation from normal activity on the network. However, these systems are susceptible to identifying false positives (e.g., an identification of malicious activity when the activity is in fact not malicious). These systems are undesirable because they heavily rely on the subjective skills and understanding of human employees. Therefore, these systems are also susceptible to unreliable results.

In yet other systems, malicious activity is identified by learning historic malicious activity patterns. In a first example, a chain of rules may result in an identification of malicious activity. However, these systems may have varying degrees of accuracy of malicious activity identification if the chain of rules is overcomplicated and/or oversimplified.

In another example, a machine learning model may be trained to identify malicious activity in the network. However, these systems may achieve limited accuracy as the models may be underfit, resulting from training the model with limited labeled malicious activity data. Training a machine learning model to identify malicious activity using supervised learning requires sufficient input-output pairs (e.g., an input with a corresponding labeled output). However, many systems may not encounter sufficient malicious activity to create the required number of input-output pairs to adequately train the model. In addition, even if the machine learning models are trained properly, the machine learning models may not accurately identify new/evolved techniques/approaches of executing malicious activity because the machine learning model may not be trained to identify new/evolved techniques/approaches of executing the malicious activity.

SUMMARY

The amount of data and/or alerts manually evaluated by security analysts may be handicapped by resources (e.g., human resources/availability to process data, computational resources to process data). Accordingly, there is a desire for meaningful alert detection that provides context for unusual and/or potentially malicious activity, case generation algorithms that correlate alerts that reflect a pattern of compromise, and machine learning models to take automated action on cases. For the aforementioned reasons, there is a need for a system configured to automatically identify malicious activity in a network that can overcome the above-noted drawbacks. In particular, the system advantageously identifies malicious activity based on historic patterns of attack, but can also identify new patterns of attack/new malicious activity not yet learned by the system, while still reducing the false positive rate. The system further identifies unintentional activity (e.g., not malicious activity) that may reduce the security of the network, data in the network, and the like.

Using the methods and systems described herein, a processor or a server in a system/network can evaluate network activity to determine whether the network activity is malicious activity indicative of a future cyberattack on the system/network. The processor/server can generate a network activity score to identify whether the activity monitored by the processor/server is likely malicious activity. The modeling executed by the server/processor to score the monitored activity may result in an automated action (e.g., dynamic provisioning) or other notification based on an evaluation of the scored activity.

In one embodiment, a method may comprise: monitoring, by a computer, network activity of a user having a baseline network activity; executing, by the computer, a machine learning model to determine a network activity score indicating a likelihood of the network activity being malicious activity for the baseline network activity, the machine learning model having been previously trained based on malicious activity and corresponding baseline network activity; and displaying, by the computer, the network activity score.

The method may further comprise generating, by the computer, a similarity score based upon a distance between the network activity score and a centroid of a cluster of network activity scores; and evaluating, by the computer, the network activity score based on the similarity score. Evaluating, by the computer, the network activity score may be based on the similarity score further comprises: determining, by the computer, that the network activity score is a strong network activity score based on the similarity score satisfying a high similarity threshold, the strong network activity score indicating that the network activity score is accurate. Evaluating, by the computer, the network activity score based on the similarity score further comprises: determining, by the computer, that the network activity score is not a strong network activity score based on the similarity score not satisfying a low similarity threshold, the not strong network activity score indicating that the network activity score is not accurate.

The cluster of network activity scores may be determined by associating one or more historic network activity scores with the centroid of the cluster of network activity scores. The baseline of network activity may be based at least on one of historic network activity of the user generating the network activity, or average network activity of the user generating the network activity. The baseline of network activity may be further based on at least on one of historic network activity of a group of similar users, average network activity of the group of similar users, historic network activity of another user, or average network activity of the another user. The machine learning model may be based on executing one or more computer models to evaluate the network activity using at least one of a binary decision, the baseline of network activity, or a statistical model. Determining the network activity score may comprise mapping a difference between the network activity and the baseline of network activity to the network activity score. Determining the network activity score may also comprise mapping a decision of the binary decision to the network activity score. Determining the network activity score may also comprises generating a weighted sum of one or more network activity scores determined by the one or more computer models.

In another embodiment, a system may comprise a server comprising a processor and a non-transitory computer-readable medium containing instructions that when executed by the processor cause the processor to preform operations comprising: monitoring network activity of a user having a baseline network activity; executing a machine learning model to determine a network activity score indicating a likelihood of the network activity being malicious activity for the baseline network activity, the machine learning model having been previously trained based on malicious activity and corresponding baseline network activity; and displaying the network activity score.

The processor may be further configured to perform operations comprising: generating a similarity score based upon a distance between the network activity score and a centroid of a cluster of network activity scores; and evaluating, by the computer, the network activity score based on the similarity score. Evaluating the network activity score based on the similarity score further comprises: determining that the network activity score is a strong network activity score based on the similarity score satisfying a high similarity threshold, the strong network activity score indicating that the network activity score is accurate. Evaluating the network activity score based on the similarity score further comprises: determining that the network activity score is not a strong network activity score based on the similarity score not satisfying a low similarity threshold, the not strong network activity score indicating that the network activity score is not accurate. The cluster of network activity scores may be determined by associating one or more historic network activity scores with the centroid of the cluster of network activity scores. The baseline of network activity may be based at least on one of historic network activity of the user generating the network activity, or average network activity of the user generating the network activity. The baseline of network activity may be further based on at least on one of historic network activity of a group of similar users, average network activity of the group of similar users, historic network activity of another user, or average network activity of the another user. The machine learning model may be based on executing one or more computer models to evaluate the network activity using at least one of a binary decision, the baseline of network activity, or a statistical model. Determining the network activity score may comprise mapping a difference between the network activity and the baseline of network activity to the network activity score.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
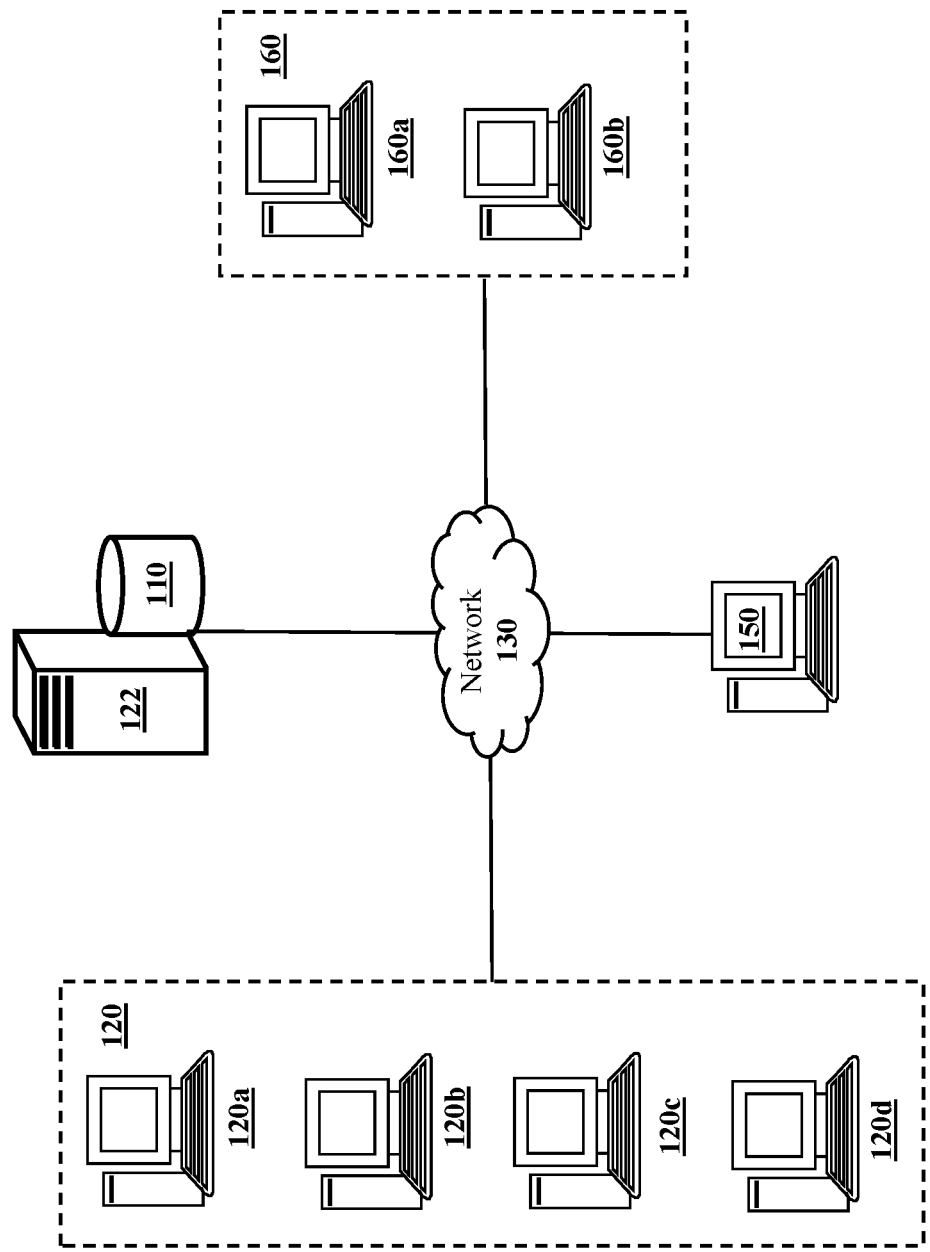
FIG. 1 illustrates components of a system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

According to certain aspects, embodiments in the present disclosure relate to employing a data-driven model used to identify malicious activity that is not necessarily in a pre-defined (well-known) pattern (while simultaneously identifying malicious activity in well-known patterns) by scoring network activity in terms of a likelihood of the network activity being malicious. The systems and methods described herein may contextualize data to determine or identify whether the data is indicative of malicious activity. The systems and methods described herein may utilize information across multiple users (e.g., comparing network activity to historic user activity, comparing network activity to users in a similar group) and across multiple sources (e.g., determining origination internet service provider (ISP), determine IP address source, and evaluate user specific file requests/command lines) to automate malicious activity identification.

FIG. 1 illustrates components of a system 100, according to an embodiment. The system 100 may contain user devices 120a-d (collectively user devices 120), administrator devises 160a-b (collectively administrator devices 160), external device 150, analytics server 122, a database 110, and a network 130. The system 100 is not confined to the components described herein and may include additional or alternate components, not shown for brevity, which are to be considered within the scope of the embodiment. Embodiments may include or otherwise implement any number of devices capable of performing the various features and tasks described herein. In one example, FIG. 1 shows the analytics server 122 as a distinct computing device. Additionally or alternatively, the analytics server 122 may be implemented as a distributed system or as a single device. In the case of a distributed system, one or more processors in other devices may be and sometimes are, used to perform one or more steps attributed to the analytics server 122 in this embodiment. Embodiments may comprise additional or alternative components, or may omit certain components, and still fall within the scope of this disclosure.

The user devices 120, administrator devices 160, analytics server 122, and the database 110, communicate with each other over via communication links of the network 130. The network 130 may be a public or private network, and the communications links that connect to network 130 may be wired or wireless. Non-limiting examples of the network 130 may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The user device 120 may be any computing device comprising a processor and a non-transitory machine-readable storage medium capable of performing the various tasks and processes described herein. Non-limiting examples of a user device 120 may be a workstation computer, laptop computer, tablet computer, and server computer. The user device 120 is used by one or more users of a network, where the use of the device creates network activity (e.g., uploading data, downloading data, accessing files locally/remotely). The network activity can include local network activity and/or remote network activity (e.g., activity in a cloud-computing environment accessed over a network cloud). The network activity from the user device 120 is monitored by the analytics server 122.

Users may be authorized for network use using a user account/user profile. Each user account may be associated with different permission levels regarding that account's network activities, data access, and the like. For example, the analytics server 122 may authorize users based on a set of user authorization credentials (e.g., username, password, biometrics, cryptographic certificate, and the like). In such implementations, the analytics server 122 may access the database 110 (configured to store user credentials) in order to determine whether a set of entered credentials (purportedly authenticating the user) match an appropriate set of credentials stored in the database 110 that identify and authenticate the user. The analytics server 122 may authenticate the user and may identify the user's role by executing an access directory protocol (e.g. LDAP).

The administrator device 160 may be any computing device comprising a processor and a non-transitory machine-readable storage medium capable of performing the various tasks and processes described herein. Non-limiting examples of the administrator device 160 may be a workstation computer, laptop computer, tablet computer, and server computer. The administrator device 160 is used by one or more administrators of the network, where the use of the device creates network activity and/or evaluates network activity. One difference between the user device 120 and the administrator device 160 is the user operating the device. For example, an everyday user operates user device 120 and a specialized user such as a user in a security team, operates administrator device 160. A user may be identified as a specialized user based on permissions associated with the user account, where the user's role may be defined by data fields and input fields in user records stored in the database 110.

The external device 150 may be any computing device used by one or more third parties not enrolled/authorized to be part of the network. One difference between the user device 120/administrator device 160 and the external device 150 is the access to the network. For example, the user devices 120/administrator devices 160 are authorized to access the network, while the external devices 150 are not authorized to access the network.

The database 110 may be a computing device configured to store, manage, and/or organize network data and/or user data. Non-limiting examples of what may be stored in the database 110 may include: user records that may comprise data fields describing users (e.g., user data), such as user credentials (e.g., username, passwords, biometrics, encryption certificates), user account data, user roles or user permissions; document records that may comprise machine-readable computer files (e.g., word processing files), parsed portions of such computer files, or metadata associated with computer files; application data that may include software instructions executed by the analytics server 122 or data used by such applications executed by the analytics server 122, thresholds determined by administrators via the administrator device 160, trained machine learning models, historic network activity, historic network activity scores, and the like.

The analytics server 122 may be any computing device comprising a processor and non-transitory machine-readable storage capable of executing the various tasks and processes described herein. The analytics server 122 is configured to monitor network activity on a local computing network (e.g., network 130) and/or monitor the network remotely (e.g., in a cloud-computing environment). The analytics server 122 may execute a security operations software application and generate data to be displayed to an administrator device 160.

The administrator devices 160 may display, using a graphical user interface (GUI) generated by the security operations software application, network activity scores. An example GUI generated and hosted by the analytics server 122 may be a web-based application or a website configured to be displayed on different electronic devices, such as mobile devices, tablets, personal computers, and the like. The network activity scores evaluate network activity of users using user devices 120, and/or network activity of external devices 150.

In operation, the analytics server 122 monitors network activity generated by one or more devices (e.g., user devices 120, external devices 150, administrator devices 160). The monitored activity is fed into the security operations software application to determine a network activity score associated with the monitored network activity. In some embodiments, the network activity score is displayed to a user using an administrator device 160. For example, the analytics server 122 may display the network activity score using a dashboard of the security operations software application. In other embodiments, the network activity score is further processed by the analytics server 122. For example, the analytics server 122 may employ a machine learning model to evaluate the network activity score associated with the network activity to determine whether the network activity is malicious activity. As described with reference to FIG. 4, the machine learning models may be trained to utilize contextual information to determine whether the monitored (suspicious) activity is a benign anomaly or an indication of compromise. As such, operators (human analysts, administrators, etc.) may spend less time/resources gathering information across different source systems and evaluating the context of the network activity.

It should be appreciated that while identifying malicious network activity is described in various embodiments, other types of unintentional/unwanted behavior may also be identified. For example, the analytics server 122 may be configured to identify insider activity resulting from a user logging into a particular server (e.g., an enterprise server) while not being on a particular network (e.g., an enterprise network). This type of activity may be unwanted because it is less secure and may result in increased opportunities of cyber-attacks. This type of activity may be important to identify such that machine learning models, administrators and/or other analysts/operators understand and learn how various protocols are bypassed, even though the activity is not malicious activity on the part of the user.

Figure 2:
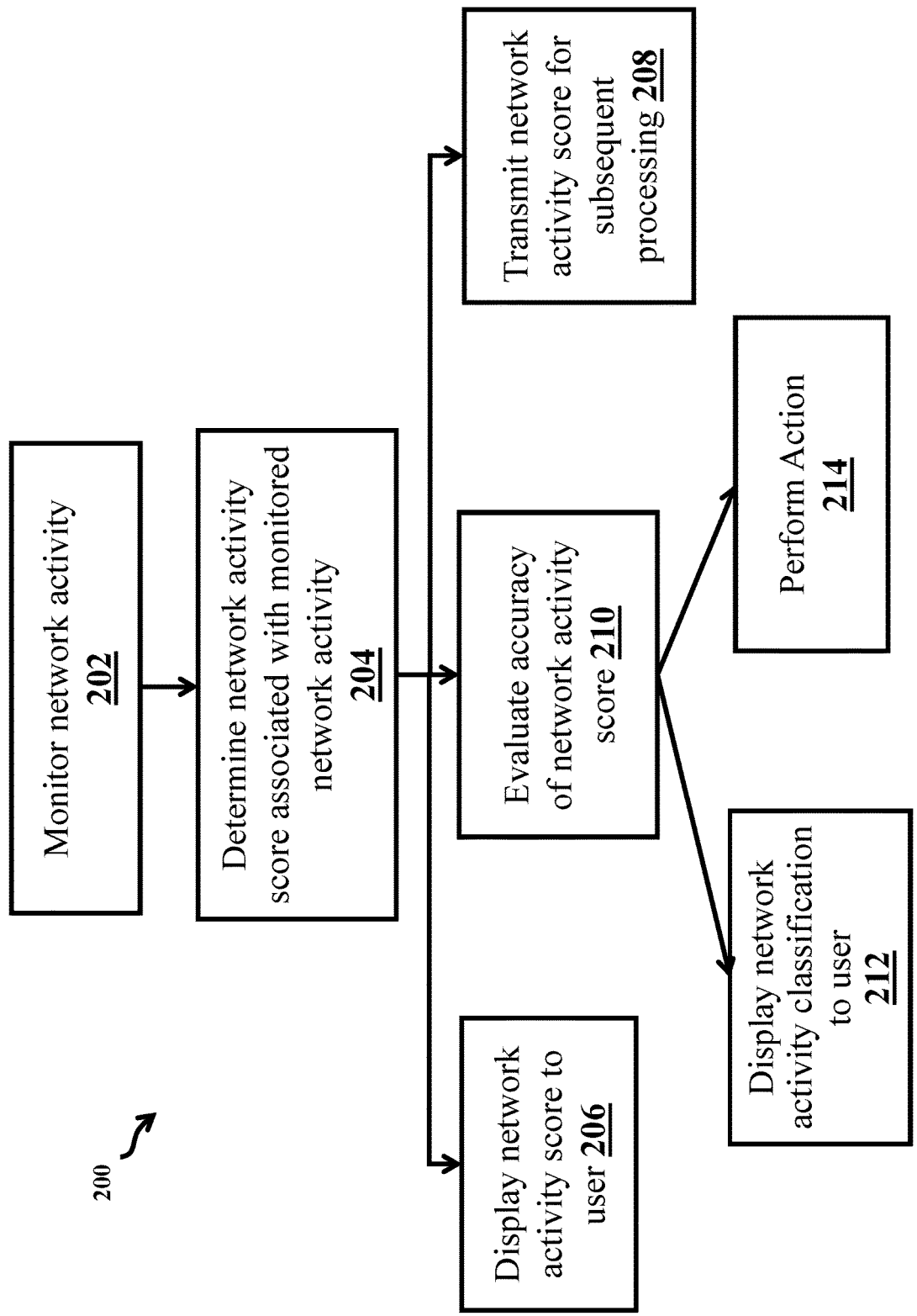
FIG. 2 illustrates a flow diagram of a method for determining a network activity score, according to an embodiment.

FIG. 2 illustrates a flow diagram of method 200 for determining a network activity score, according to an embodiment. Other embodiments of executing the method 200 may comprise additional or alternative steps or may omit some steps altogether.

At step 202, the analytics server monitors the network activity of one or more devices (e.g., user devices 120, external devices 150, administrator devices 160). The network activity may be activity generated on the network in response to a user using the device. For example, network activity includes activity related to files accessed by the user using the device, log-ins (and corresponding log-in timestamps and log-in geographic identifiers), data downloaded, data uploaded, and the like. Each user using the network may be associated with a baseline network activity (e.g., the network activity that is commonly associated with the user using the device, normal user behavior). For example, baseline network activity may include a number of file shares accessed per time period (e.g., per day, per week), a frequency that the user calls information gathering commands on the command line (e.g., dumping operating service credentials), a number of files containing sensitive data (high priority data, protected data, etc.) that the user prints, a number of user authentication events, etc. In some embodiments, certain baseline network activity may not be associated (or stored) with one or more users. For example, in the event that one or more rules are in place, baseline network activity may not be needed/monitored if certain command line tools are only associated with malicious activity. Additionally or alternatively, baseline network activity may be defined with respect to one or more servers (as opposed to one or more users).

The analytics server monitors the network activity of each device, (or a group of devices) continuously, periodically (e.g., every day from 8:00 AM-5:00 PM, every hour for one minute, every hour for 15 seconds), and/or in response to one or more triggering conditions. Triggering conditions can include data downloads in excess of a threshold number of bytes, access to one or more "bait" folders in the network (the "bait" folder being a folder in which a normal user would not access, but which may be of interest to hackers or other malicious users), detection of a threshold number of users (e.g., multiple log-ins associated with a user), and the like. In some embodiments, monitoring the network activity includes recording and/or storing the network activity (e.g., storing the network activity in database 150 of FIG. 1, for instance). The monitored data may be in the form of raw logs and/or summarized data from one or more external sources. In some embodiments, the analytics server may summarize data using the raw logs.

At step 204, the analytics server determines a network activity score associated with the monitored network activity by executing a machine learning model. The machine learning model (or other computer model) may be configured with one or more computer models (e.g., models configured to evaluate the monitored network activity, machine learning models), trained to determine a network activity score indicating a likelihood of the network activity being malicious activity. As described herein, the machine learning model (or other computer model) may be trained based on malicious activity, binary decisions, baselines of network activity, statistical models, and/or some combination.

Figure 3A:
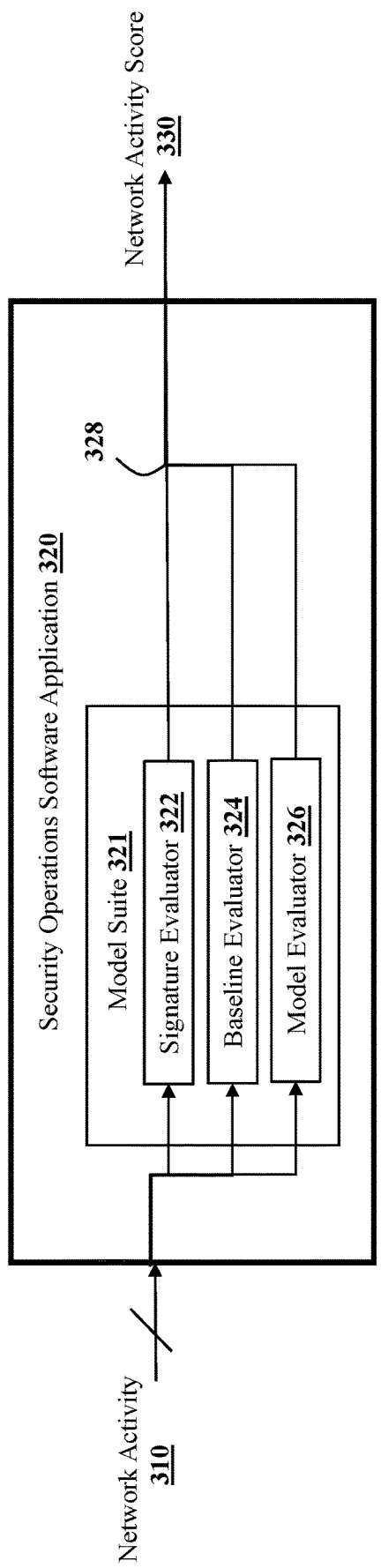
FIGS. 3A-3B illustrate a non-limiting visual example of a workflow of a security operations software application configured to score network activity, according to an embodiment.
Figure 3B:
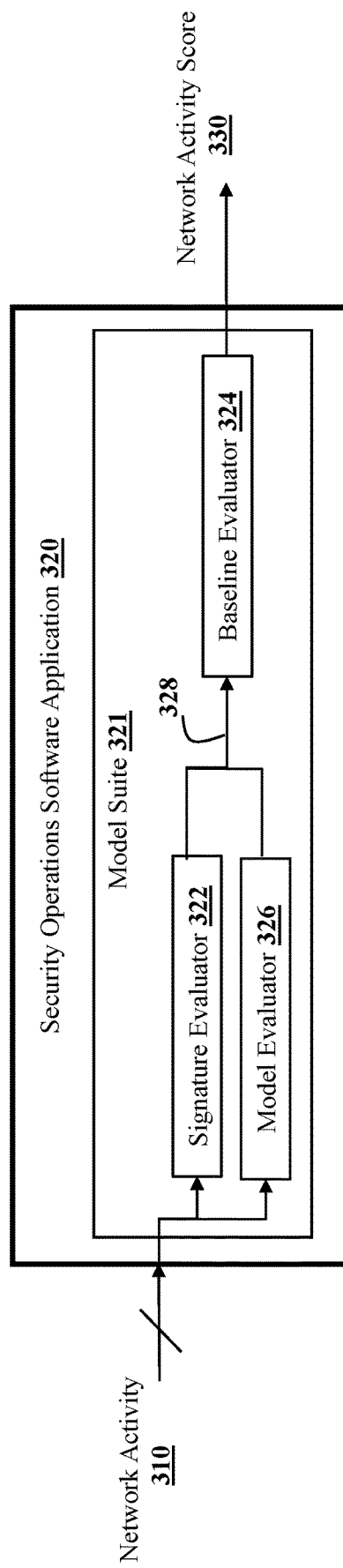

FIGS. 3A-3B illustrate non-limiting visual examples of a security operation software application configured to score network activity, according to example embodiments. Using the model suite 321 of the security operations software application 320 (e.g., the signature evaluator 322, the baseline evaluator 324, and the model evaluator 326), the security operations software 320 may be able to provide meaningful detections (also referred to as "network scores") using context associated with each network score. The provided context, in the form of the relevant features used in determining the network score, is used to determine whether the monitored network activity 310 is indicative of malicious behavior. Relevant features (e.g., context) associated with the network score include features determined from the various evaluators of the model suite 321. For example, relevant features of the signature evaluator 322 (discussed herein) may include an above threshold number of authentications, a below threshold Internet Service Provider (ISP) origination, and relevant features of the baseline evaluator 324 (discussed herein) may include an average network activity score of the user generating the network activity, an average network activity score of one or more groups of similar users, and the like.

Referring to FIG. 3A, the monitored network activity 310 is fed into the security operations software 320 operated by the analytics server. However, in some embodiments, the analytics server may process the network activity 310 before feeding the network activity 310 into the model suite 321. For example, the analytics server may normalize the network activity 310. For instance, the analytics server may convert the network activity 310 into a vector representation to encode categorical network activity into numeric network activity. Additionally or alternatively, the analytics server may perform a DNS lookup and/or otherwise ping one or more devices associated with the monitored network activity 310 to determine identifying information about the device (e.g., a geographic location, an IP address). The analytics server may also timestamp network activity 310 to keep track of the chronology and/or patterns of the network activity 310.

The model suite 321 of the security operations software application 320 is configured to execute logic (e.g., the signature evaluator 322, the baseline evaluator 324, and/or the model evaluator 326) to score the network activity and generate a network activity score of 330. The network activity score of 330 indicates a likelihood that the network activity is malicious. The model suite 321 may detect malicious activity by matching specific known patterns of attack (e.g., a signature-based approach) and/or alerting one or more administrators/operators of anomalies by analyzing a user's normal behavior on the system (e.g., an anomaly-based approach). In this manner, the model suite 321 generates contextually enriched alerts by determining relevant features (context) associated with each of the evaluators of the model suite 321. Combining one or more approaches (e.g., signature-based approaches and/or anomaly-based approaches) using the one or more evaluators (e.g., the signature evaluator 322, the baseline evaluator 324, and/or the model evaluator 326) enables the model suite 321 to determine the contextually enriched alerts. By building alerts using a framework of known attacks (such as the industry standard MITRE ATT@CK Framework) and using the known attack techniques as a blueprint for where to look for anomalous activity, the model suite 321 is able to identify both known and evolving network attacks.

In some embodiments, the security operations software 320 may output score context information. Score context information can include the results of the signature evaluator 322, the baseline evaluator 324, and/or the model evaluator 326, and how far the network activity score 330 is from an average network activity score associated with the user. If the user does not have an average network activity score, this may indicate that the user is an unauthorized user (via external device 160) and/or a new user.

The model suite 321 is a flexible/modular suite of the logic configured to score the network activity 310. Additional logic (e.g., classifiers, models, etc.) may be added, updated, or removed from the model suite 321. For example, logic may be added to the model suite 321 in the event that new/evolved technique(s) are employed to perform malicious activity. The new logic may be configured to identify, detect and/or evaluate the new techniques for performing malicious activity.

Evaluators (e.g., computer models) of the model suite 321 are added/updated in response to simulating attacks on the network and determining gaps in network security. The simulated attacks may be executed by one or more third parties, one or more users (e.g., administrators using user device 120), and/or computer models configured to simulate security breaches in the network. For example, the simulated attacks may include common hacking techniques/sub-techniques. The simulated attacks provide data that users (e.g., administrators using administrator devices 160) may identify and label as malicious activity data. The analytics server stores the malicious activity data such that future computer models/applications executed by the analytics server (e.g., security operations software application 320) have access to labeled malicious activity data for supervised learning. Accordingly, the analytics server may train machine learning models based on malicious activity.

The simulated attacks may facilitate the identification of: weaknesses in the evaluators of the model suite 321 (e.g., whether one or more evaluators of the model suites may need to be retrained or otherwise updated), new evaluators that may be added to the model suite 321, obsolete evaluators in the model suite 321, and the like. For example, users (e.g., administrators using administrator devices 160 in FIG. 1) analyzing the simulated attacks, may determine that an evaluator needs to be retrained.

The signature evaluator 322 is a rule-based classifier that evaluates the network activity 310 with respect to one or more binary decisions (e.g., a signature-based approach). The signature evaluator 322 enables accurate identification of malicious activity by classifying malicious activity using known/historic/previous malicious attack patterns. However, the signature evaluator 322 may be limited in identifying malicious activity based on known attack patterns.

Figure 5:
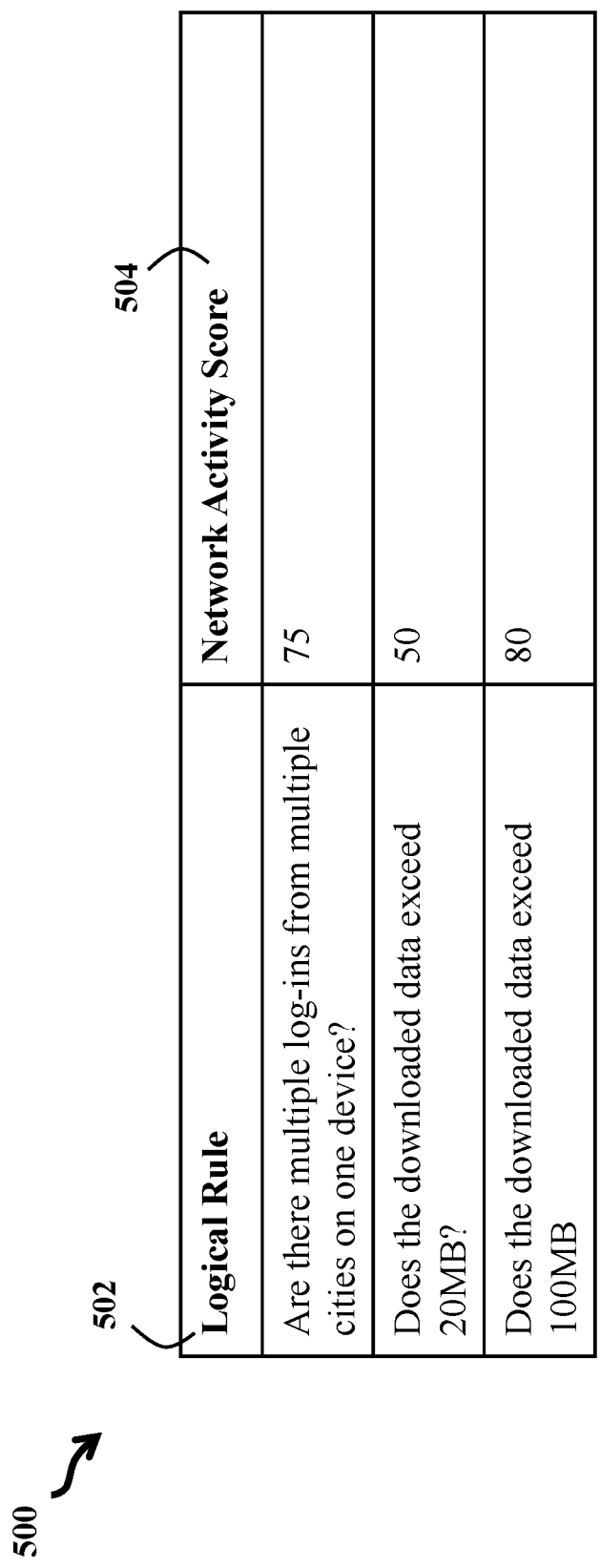
FIG. 5 depicts an example lookup table mapping logical rules to predetermined network activity scores, according to an embodiment.

For example, the signature evaluator 322 may evaluate whether the number of log-ins associated with a user profile satisfies a threshold number of log-ins, whether the user profile has logged in from a threshold number of cities, and the like. In some embodiments, the signature evaluator 322 is configured to evaluate chains of binary decisions. In some embodiments, each logical rule (and/or chains of logical rules) are associated with a network activity score. The network activity score may be determined by administrators using the administrator device 160. Referring to FIG. 5, depicted is an example lookup table 500 mapping logical rules to predetermined network activity scores, according to an embodiment. As shown, the lookup table 500 includes logical rules 502 and corresponding network activity scores 504. If the signature evaluator (e.g., signature evaluator 322 in FIG. 3A) determines that the network activity fails all of the logical rules 502, the associated network activity score may be 0. This may represent that the network activity is likely not malicious activity. If the signature evaluator determines that the network activity passes a logical rule, the network activity receives a predetermined network activity score 504 mapped to the logical rule. If the signature evaluator determines that the network activity passes multiple logical rules of the signature classifier, the signature evaluator may algorithmically or statistically combine the scores associated with each of the logical rules 502.

Referring back to FIG. 3A, the baseline evaluator 324 evaluates the network activity 310 by comparing the network activity 310 to various baselines of network activity (e.g., an anomaly-based approach). The baseline evaluator 324 enables identification of new types of attacks (e.g., attacks with unknown attack patterns). However, the baseline evaluator 324 may be associated with a high false positive rate (e.g., false identifications of malicious activity).

The baseline evaluator 324 may compare the network activity 310 (e.g., the type of network activity, the time/date of the network activity, and the like) to similar historic network activity of the user responsible for generating the network activity 310 (referred to herein as historic network activity). The baseline evaluator 324 retrieves historic network activity from a database storing network activity, user profile information, user group information, network activity scores, and the like (e.g., database 110 in FIG. 1).

In an example, the baseline evaluator 324 may compare the network activity monitored on one or more previous days to the network activity 310. In a different example, the baseline evaluator 324 may compare the network activity monitored a short duration of time before the network activity 310 to the network activity 310. Accordingly, the baseline evaluator 310 is configured to evaluate the network activity of a user throughout the day. In this manner, the baseline evaluator 310 will determine whether the user is associated with multiple suspicions actions, indicating an increased likelihood that the user's account is compromised and/or the user may be an insider threat to the network security.

Additionally or alternatively, the baseline evaluator 324 may compare an average historic network activity to the network activity 310. The baseline evaluator 324 scores the network activity 310 based on the similarity of the historic network activity to the network activity 310. The baseline evaluator determines the similarity of the historic network activity to the network activity 310 by evaluating the difference between the historic network activity and the network activity 310. Accordingly, the baseline evaluator 324 determines how much the network activity 310 deviates from historic network activity. The similarity of the network activity 310 to the user's historic network activity is the basis for the network activity score. For example, the baseline evaluator 324 may use a lookup table to map ranges of network activity similarity to predetermined network activity scores. If the baseline evaluator 324 determines that the network activity 310 is similar to the historic network activity (e.g., within a predetermined range), the baseline classifier 324 may assign a low score to the network activity 310. If the baseline classifier 324 determines that the network activity 310 is not similar to the historic network activity, the baseline evaluator 324 may assign a high score to the network activity 310.

The baseline evaluator 324 may also compare the network activity 310 (including the type of network activity, the time/date of the network activity, and the like) to network activity of a group of similar users and/or network activity of other users. For example, the baseline evaluator 324 compares the network activity 310 to network activity (e.g., historic network activity) of a group of similar users. In another example, the baseline evaluator 324 compares the network activity 310 (e.g., the type of network activity, the time/date of the network activity, and the like) to network activity (e.g., historic network activity) of other one or more users (e.g., the one or more other users may not be identified as being similar to the user responsible for the network activity 310).

The user (e.g., user profile) associated with the monitored network activity 310 may be associated with one or more groups of users. Groups of users may be formed by associating similar users. For example, groups of similar users can include users with the same occupational description (e.g., users doing marketing work, users doing engineering work, users doing legal work), users the same age (or within a predetermined range), users the same race, users the same gender, user in the same location (e.g., users working in the same building, users working remotely from home), and the like. The users may be identified as belonging to one or more groups of users based on information in the user profile. For example, a data field in the user profile may indicate that the user works in a particular office building. In these embodiments, the baseline evaluator 324 retrieves network activity associated with the one or more groups of similar users from a database storing network activity, user profile information, user group information, network activity scores, and the like (e.g., database 110 in FIG. 1). The baseline evaluator 324 will compare the network activity 310 to retrieved network activity (and/or average network activity) of the known/similar one or more groups of users. The baseline evaluator 324 determines the network activity score based on the similarity of the network activity 310 to the retrieved network activity of the one or more similar groups of users. As described herein, a lookup table may map predetermined ranges of network activity to predetermined network activity scores.

In some embodiments, the user (e.g., user profile) associated with the monitored network activity 310 may be not associated with one or more groups of users. In these embodiments, the baseline evaluator 324 may classify the monitored network activity 310 as belonging to at least one user group using decision trees, random forests, support vector machines (SVM), neural networks, and the like.

In an example implementation, the baseline evaluator 324 may train one SVM per user group. Each SVM may make a binary determination as to whether the user associated with the monitored network data 310 corresponds to the particular user group associated with the SVM. The baseline evaluator 324 transforms the inputs of the SVM (e.g., monitored network activity 310, time of day, user profile information, location of user) into a higher dimension (e.g., mapping the data to a new dimension, employing the "kernel trick" using sigmoid kernels, polynomial kernels, radial basis function kernels, and the like) such that the data is linearly separable. The baseline evaluator 324 trains the SVM by iteratively determining an optimal position of a decision boundary. The decision boundary is the boundary responsible for separating the linearly separable data (e.g., separating data corresponding to the user group associated with the SVM with data corresponding to a user group that is not the user group associated with the SVM). The optimal decision boundary is the decision boundary that accurately separates the linearly separable data while maximizing the margin between the linearly separable data. The baseline evaluator 324 tunes the decisions boundary by taking the gradient of a cost function (such as the hinge loss function) to maximize the margin of the decision boundary with respect to the user group associated with the SVM.

The baseline evaluator 324 applies the network data 310 to various trained SVMs to identify which groups of users, if any, the user associated with the network data 310 belongs to (e.g., to identify one or more similar groups of users). Subsequently, the baseline evaluator 324 retrieves historic network activity (including the type of network activity, the time/date of the network activity, and the like) of the identified one or more groups of similar users (e.g., from the database 110 in FIG. 1). As described herein, the baseline evaluator 324 determines the network activity score based on the similarity of the network activity 310 to the network activity of the identified one or more groups of similar users.

The baseline evaluator 324 may determine that the monitored network activity 310 does not belong to one or more groups of users. If the baseline evaluator 324 makes this determination a threshold number of times, the baseline evaluator 324 may retrain the SVMS (or other classifiers). In some embodiments, in response to not being able to identify a similar group of users, the baseline evaluator 324 assigns a predetermined network activity score to the network activity 310. In other embodiments, in response to not being able to identify a similar group of users, the baseline evaluator 324 may compare the network activity 310 to one or more other users. Accordingly, the baseline evaluator 324 retrieves historic network activity (including the type of network activity, the time/date of the network activity, and the like) of the users (e.g., from the database 110 in FIG. 1) and determines the network activity score based on the similarity of the network activity 310 to the network activity of the one or more users. In some embodiments, even if the baseline evaluator identifies one or more groups of similar users, the baseline evaluator may compare the network activity 310 to one or more other users.

The baseline evaluator 324 may compare the network activity 310 to both the network activity (e.g., average network activity) of the user associated with the monitored network activity 310, and a network activity (e.g., average network activity) of one or more users. In some embodiments, the baseline evaluator 324 may algorithmically or statistically combine the network activity scores resulting from the baseline evaluator's 324 comparison of the network activity 310 to various users/groups of users (e.g., comparing the network activity 310 to historic network activity associated with the user responsible for generating the network activity 310, comparing the network activity 310 to one or more groups of similar users, comparing the network activity 310 to one or more other users).

In other embodiments, the baseline evaluator 324 may evaluate the network activity scores resulting from the baseline evaluator's 324 comparison of the network activity 310 to various users/groups of users. In this manner, the baseline evaluator 324 is configured to correlate suspicious activity by being able to identify whether there are multiple suspicious actions across multiple users, indicating an increased likelihood of a network-wide attack such as a phishing attack. The baseline evaluator 324 is also configured to correct network activity scores by being able to identify falsely high network activity scores. For example, the baseline evaluator 324 comparison of the network activity 310 to other users (e.g., groups of similar users) may reveal that although the monitored network activity 310 deviates from the standard behavior of the user associated with the network activity (resulting in the baseline evaluator 324 assigning a high network activity score to the network activity 310), the monitored activity 310 may align with monitored (or historic) network activity of other users. Accordingly, the baseline evaluator 324 reduces the network activity score to reflect that the monitored network activity 310 is likely not malicious (e.g., there is a non-malicious reason why the monitored network activity 310 may be deviating from the typical network activity of that user).

The model evaluator 326 evaluates the network activity 310 using one or more statistical models/approaches. In particular, the model evaluator 326 identifies anomalies based on activity that may be relevant to potential attacks.

The model evaluator 326 may employ models/techniques, such as rank-turbulence divergence of allotaxonometry, which compares complex systems by creating a histogram for ranked pairs with an ordered list of components according to the components divergence contribution, to evaluate the network activity. For example, rank-turbulence divergence may be useful for comparing the difference in the change of ordering/ranking of items between entities (e.g., two networks or two users). In a particular example, the model evaluator 326 may employ rank-turbulence divergence to cluster users on a network based on their SSH destinations. Employing rank-turbulence divergence as the distance metric for clustering may result in improved clustering (e.g., more users being assigned to a cluster than other clustering methods such as kernel density clustering or other hierarchical clustering algorithms, sequential clustering algorithms, etc.). In a particular example, an evaluator employing kernel density clustering to compare a user's SSH activity week-to-week may determine a peak at, for example 0.75 (indicating high divergence). In contrast, the evaluator employing rank-turbulence divergence to compare the user's SSH activity week-to-week may determine peaks near 0. This suggests that the relative frequencies of SSH destinations for a given user are highly volatile but the relative ordering of the destinations may be stable.

Additionally or alternatively, the model evaluator 326 may employ a Markov chain (or other stochastic automata) to model domain likelihood to identify fluxed domains, which may be indicative of compromise. Markov modeling may be used for detection based on building a predictive model of what is to be expected next (e.g., characters in a domain name, log events, etc.).

In an example implementation, the transition probability, (the probability that a current state of the Markov chain may move forward to a next state, the probability that the current state of the Markov chain may move backward to a previous state, and/or the probability that the current state of the Markov chain may stay in the same state), may be calculated based on historic network activity (e.g., retrieved from database 110) and updated using the monitored network activity (e.g., network activity 310).

The model evaluator 326 may also employ statistical modeling approaches such as least recently used cache (LRU). When the model evaluator 326 employs LRU, the model evaluator 326 models the statistical likelihood of the amount of rare activity for an individual user via the user of a least recently used cache. When the model evaluator 326 employs LRU, evictions from the cache reflecting unusual activity are counted. The model evaluator 326 may also employ other statistical models such as the count model. When the model evaluator 326 employs the count model, the model evaluator 326 may generate a statistical model of the counts of an activity for an individual user (e.g., such as counts of login events).

The model evaluator 326 may also employ machine learning or other deep learning algorithms. For example, long-short term memory networks (LSTM) networks may advantageously evaluate network activity using the temporal/sequential information of the monitored data. When the model evaluator 326 employs the LSTM, the model evaluator 326 predicts whether the monitored data (and other contextual data fed into the LSTM model such as the network score determined by the signature evaluator 322 and/or the network score determined by the baseline evaluator 324) is likely malicious activity. The LSTM model leverages long term dependencies (e.g., historic monitored data associated with the user) to evaluate whether the monitored activity is suspicious (e.g., indicative of anomalies).

The model evaluator 326 may train the LSTM model (or other deep learning algorithms, machine learning models, and the like) using supervised learning. Supervised learning is a method of training a machine learning model given input-output pairs. An input-output pair is an input with an associated known output (e.g., an expected output, a labeled output, a ground truth). The model evaluator 326 may train the LSTM model on known input-output pairs (e.g., monitored contextualized user data such as network activity 310 and a corresponding network activity score) such that the LSTM learns how to predict known outputs given known inputs. In some embodiments, the input-output pairs may be monitored contextualized user data such as network activity 310 and a corresponding network activity classification (e.g., malicious, benign). Once the LSTM model has learned to predict/classify input-output pairs (e.g., a training iteration threshold is satisfied, an error threshold is satisfied, a time threshold is satisfied), the model evaluator 326 may apply the LSTM on unknown inputs to predict/classify an output.

Additionally or alternatively, the model evaluator 326 may employ an autoencoder. Autoencoders are self-supervised (or unsupervised) models that learn the relationships required to transform an input into a particular output. For example, various encoders may be trained using historic network activity and corresponding true positives (e.g., identified malicious activity) and false positives (e.g., network activity incorrectly identified as malicious activity).

The model evaluator 326 may also employ other machine learning algorithms such as isolation forests. Isolation forests may be used to identify anomalies from a dataset (e.g., identify suspicious/malicious behavior of the monitored network activity). Isolation forests are unsupervised models that identify outliers of data (anomalies) using trees constructed from data points (e.g., network activity 310) and randomly selected features of each data point. Generally, if a tree associated with a data point has a larger number of branches relative to other isolation trees (e.g., an isolation number), the data point is likely not an anomaly as the data point likely has features similar to other data points. In contrast, if a tree associated with a data point has a small isolation number, the data point is likely an anomaly as the data point likely has features that are anomalous from other data points. The model evaluator 326 may employ one or more of the described models above to generate a network score. The model evaluator 326 may algorithmically combine the scores associated with each of the models employed by the model evaluator 326 (e.g., determine a weighted sum of each of the network scores determined by the signature classifier) to determine a network score output by the model evaluator 326.

The security operations software application 320 may algorithmically combine/aggregate the network score of one or more of the signature evaluator 322, the baseline evaluator 324, and/or the model evaluator 326 at 328 to determine a final network activity score 330. In some embodiments, the security operations software application 320 may aggregate the network score(s) using percentile-based methods. For example, the security operations software application 320 may compare the network score determined by the signature evaluator 322, the baseline evaluator 324 and/or the model evaluator 326, to a reference distribution of historic network scores determined by the signature evaluator 322, the baseline evaluator 324 and/or the model evaluator 326, to determine a percentile of the network score. In some embodiments, the security operations software 320 may scale the computed percentiles by a scaling factor (e.g., 0.1) such that they are in a particular range (e.g., the range of [0,1]). Additionally or alternatively, the security operations software 320 may map the percentile bins to a predetermined network score value. Additionally or alternatively, the security operations software 320 may convert the percentiles into binary values using predetermined thresholds.

In other embodiments, the security operations software application 320 may aggregate the network scores using non-percentile based methods. For example, the security operations software 320 may apply one or more functions (e.g., a sigmoid function, a logistic function) to the network score determined by the signature evaluator 322, the baseline evaluator 324 and/or the model evaluator 326 to scale the network score. Additionally or alternatively, the security operations software 320 may aggregate the network scores using a weighted average. In some embodiments, the weights are uniform, and in other embodiments, the weights are predetermined.

The security operations software application 320 may also be configured to aggregate the network score(s) (e.g., determined by the signature evaluator 322, the baseline evaluator 324 and/or the model evaluator 326) across time such that the network scores are not independent relative to time. In some embodiments, the security operations software application 320 may take a weighted average of historic network scores determined by the signature evaluator 322, the baseline evaluator 324 and/or the model evaluator 326. For example, the security operations software application 320 may determine the aggregate network score 328 by taking a weighted average of the historic scores over a period of time. In some embodiments, the weights may logarithmically decrease over the time period. Additionally or alternatively, the security operations software application 320 may determine the aggregate network score 328 by determining a maximum (or minimum) network score determined by one or more of the signature evaluator 322, the baseline evaluator 324 and/or the model evaluator 326 over a period of time.

The final network activity score 330 is used to determine whether the monitored activity is likely malicious activity. In some embodiments, the security operations software application 320 converts the network activity score 330 into a word/phrase (e.g., "not likely malicious activity", "likely malicious activity"), a percent, or some combination. For example, the security operations software application 320 may map the network activity score 330 into a word/phrase using a lookup table.

It should be appreciated that the configuration of the network activity evaluators (e.g., signature evaluator 322, baseline evaluator 324, and model evaluator 326) of the model suite 321 can be arranged in various orientations. The arrangement of the network activity evaluators in various orientations has the effect of evaluating/checking the network activity score determined from the network activity 310. As shown and described with reference to FIG. 3B, the monitored network activity 310 is fed to the model suite 321 to be evaluated by the signature evaluator 322 and model evaluator 326. It should be appreciated that in some embodiments, the model suite 321 may employ different evaluators to evaluate the network activity 310. As described herein, the network score(s) determined from the signature evaluator 322 and model evaluator 326 are algorithmically combined to determine a network score 328. The baseline evaluator 324 (or other one or more computer models) evaluates the network score 328. For example, instead of comparing the network activity 310 to historic network activity of one or more groups of similar users, other users, and/or historic network activity associated with the user responsible for generating the network activity 310 (as described with reference to FIG. 3A), the baseline evaluator 324 may compare the network activity score 328 (associated with the user responsible for generating the network activity 310) to historic network scores of one or more groups of similar users, other users, and/or historic network scores of the user responsible for generating the network activity 310.

The baseline evaluator 324 evaluates the deviation of the network activity score 328 from the network activity score associated with one or more groups of similar users, other users, and/or historic network scores of the user responsible for generating the network activity 310. Accordingly, the baseline evaluator 324 determines a network activity score 330 based on network activity score 328.

Referring back to FIG. 2, in step 206, the analytics server may display the network activity score (e.g., network activity score 330 determined by the model suite 321 in FIG. 3A) to an administrator. In addition to the network activity score, the analytics server may display one or more relevant features used in determining the network activity score. For example, the analytics server may display one or more relevant features associated with thresholds used while evaluating the network activity score with the signature evaluator (e.g., an above threshold number of authentications, a below threshold ISP origination). The analytics server may also display one or more relevant features associates with baselines used while evaluating the network activity score with the baseline evaluator (e.g., an average network activity score of the user generating the network activity, an average network activity score of one or more groups of similar users, and the like). Referring to FIGS. 1-3A, an administrator using an administrator device 160 may receive a notification from the security operations software application 320 if the network activity score 330 satisfies one or more thresholds. Additionally or alternatively, a dashboard executed by the security operations software application 320 may update in response to the model suite 321 determining a final activity score 330. The administrator viewing the network activity score 330 determines whether the network activity score is representative of malicious activity on the network.

Additionally or alternatively, in step 208, the analytics server may transmit the network activity score (e.g., network activity score 330 determined by the model suite 321 in FIG. 3A) to one or more processors for downstream processing. The one or more processors may be processors executed by the analytics server to operate the security operations software application 320, processors executed by the analytics server to operate one or more other applications, and/or processors executed by one or more other computing devices (e.g., third party computing devices). The downstream processing may include an evaluation of the network activity score, a display of the network activity score to one or more other users (e.g., third party users), a storage of the network activity score, and the like.

Additionally or alternatively, in step 210, the analytics server may evaluate the accuracy of the network activity score (e.g., network activity score 330 determined by the model suite 321 in FIG. 3A).

Figure 4:
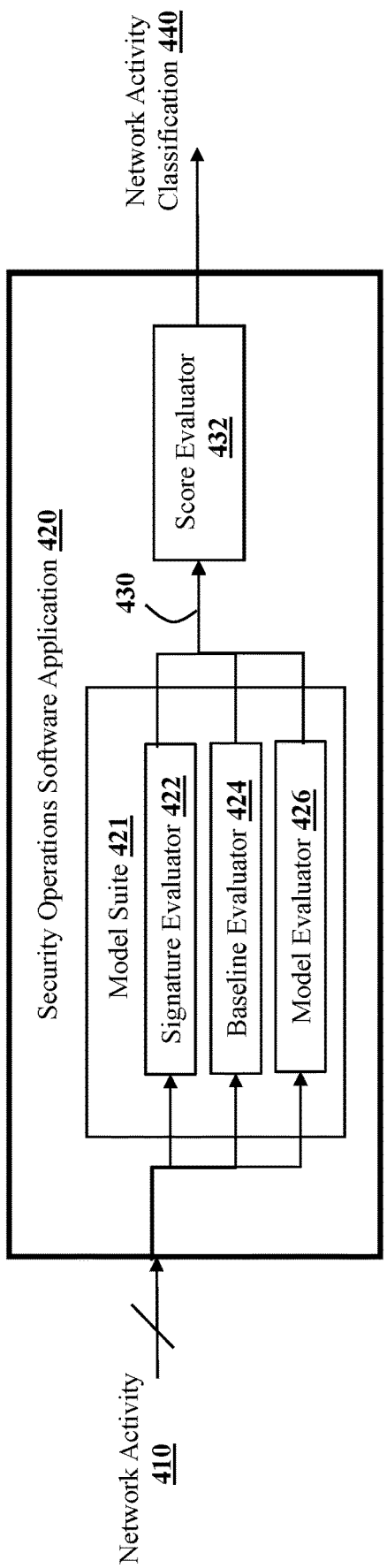
FIG. 4 illustrates a non-limiting visual example of a workflow of a security operations software application configured to evaluate the accuracy of the network activity score, according to an embodiment.

FIG. 4, illustrates a non-limiting visual example of workflow of a security operations software application 420 configured to evaluate the accuracy of the network activity score(s), according to an embodiment. The security operations software 420 is configured to correlate the detections (e.g., network score(s)) together to generate alerts/cases that may be flagged/escalated for review by one or more administrators, analysts, and the like. The security operations software 420 uses machine learning (e.g., the score evaluator 432) to evaluate the network score(s) and/or track the network score(s) over time to evaluate whether there are network activity score patterns. In this manner, the security operations software 420 evaluates whether the network activity score(s) (e.g., the cases, the detections, etc.) identified by the model suite 421 are true positives (e.g., de facto malicious activity) or false positives (e.g., mislabeled/misidentified network activity).

As shown and described with reference to FIG. 3A, the monitored network activity 410 is fed to the model suite 421 to be evaluated by at least one of the signature evaluator 422, the baseline evaluator 424, the model evaluator 426 or some combination. As described herein, the network score(s) determined from the model suite 421 are algorithmically combined/aggregated to determine a network score 430. The network score 430 is fed into a score evaluator 432.

The score evaluator 432 evaluates/automates a determination of whether the network score 430 is in fact an indicator of malicious activity using criteria. That is, the score evaluator 432 reduces the false positive rate in identifying malicious activity by comparing the network score 430 to one or more conditions and/or thresholds.

The score evaluator 432 may cluster (or otherwise associate similar network scores) the network score 430 using one or more sequential and/or hierarchical clustering algorithms to evaluate the network score 430. For example, the score evaluator 432 may compare the network score 430 to clusters of historic network scores (e.g., network scores stored in a database). The clusters of historic network scores represent network scores associated with states of network activity. For example, a cluster of network scores may correlate to the network operating normally, while a different clusters of network scores may correlate to network being compromised. That is, the network scores may not be labeled and/or associated with a state of the network, but the network scores will inherently cluster based on similarities of the network scores in similar states.

In some implementations, the score evaluator 432 clusters historic network scores by, for example, randomly generating a centroid and associating historic network scores with the centroid. The score evaluator 432 clusters historic network scores based on relative distances between the historic network scores and the centroid. The score evaluator 432 moves the centroid to a new relative location based on minimizing the average distance of each of the historic network scores associated with the centroid. Each time the centroid moves, the score evaluator 432 recalculates the distances between the historic network scores and the centroid. The score evaluator 432 iterates the clustering process until a stopping criterion is met (e.g., the historic network scores do not change clusters, the sum of the distance is minimized, a maximum number of iterations is reached). In some configurations, the score evaluator 432 measures the distances between the historic network scores and the centroids using Euclidean distance. The distances between the historic network scores and centroids are indicated using a similarity score. The closer the historic network scores are to the centroid, the higher the similarity score. The score evaluator 432 tracks the similarity scores between each of the historic network scores and centroids in a similarity matrix. In these implementations, after the historic network scores are clustered, the average historic network score may be considered the centroid for the network score cluster.

Additionally or alternatively, the score evaluator 432 may treat each historic network score as a centroid. The score evaluator 432 clusters the historic network scores based on the distances of the centroid historic network score to other historic network scores. Distance measures may include, for example, the smallest maximum distance to other historic network scores, the smallest average distance to other historic network scores, and the smallest sum of squares of distances to other historic network scores.

The score evaluator 432 creates a similarity matrix for the network sore 430 and determines the similarity of the network score 430 to other clusters of network scores. The score evaluator 432 generates a set of similarity scores based upon a relative distance between the network score 430 and the historic network score cluster (or an average historic network score), and/or based upon cosine similarity between the network score 430 and the historic network score cluster (or an average historic network score), for example.

The score evaluator 432 identifies the network score cluster and network score 430 pair having the maximum similarity score. Identifying the maximum similarity score represents the most likely state of the network based on the network score cluster. In some embodiments, one or more users (e.g., administrators) may define one or more low similarity thresholds and high similarity thresholds (e.g., criteria). Additionally or alternatively, the score evaluator 432 may determine low similarity thresholds, high similarity thresholds, and/or an optimal similarity threshold (e.g., criteria) based on preconfigured false acceptance rates. For example, one or more users (e.g., administrators) may identify one or more false acceptances rates such that the score evaluator 432 adjusts the similarity threshold in accordance with the false acceptance rate, whereby the score evaluator 432 increases or decreases the similarity threshold to meet a desired level of accuracy represented by the false acceptance rate.

The score evaluator 432 determines whether the maximum similarity score satisfies a low similarity threshold, a high similarity threshold, and/or an optimal similarity threshold (e.g., a combination of the low similarity threshold and the high similarity threshold). If the score evaluator 432 determines that the maximum similarity score satisfies the high similarity threshold, then the score evaluator 432 determines that the state of the network associated with the network score cluster is likely the state of the network associated with the network score 430. The score evaluator 432 may output a network activity classification 440 (in addition to, or instead of the network score 430) identifying that the similarity score satisfied the high similarity threshold (e.g., indicating the network score 430 is a strong network score). For example, if the network score 430 was a high value (indicating a strong likelihood of malicious activity), and the network activity classification 440 indicates that the network score 430 is a strong score, then the probability of the network activity being malicious activity is very high (e.g., the network activity score 430 is accurate).

In some embodiments, the score evaluator 432 may update the network score cluster with the network score (e.g., re-average the centroid of the network score cluster to include the network score 430). In these implementations, when the score evaluator 432 updates the network score cluster, the score evaluator 432 may take a weighted average of the network scores (and weigh the strong network scores more than other network scores) to determine the centroid of the network score cluster.

On the other hand, if the score evaluator 432 determines that the maximum similarity score fails the low similarity threshold, then the score evaluator 432 determines that the state of the network associated with the network score cluster may not likely be the state of the network associated with the network score 430. The score evaluator 432 may output a network activity classification 440 (in addition to, or instead of the network score 430) identifying that the similarity score did not satisfy the low similarity threshold (e.g., indicating the network score 430 is not a strong network score). A similarity score may not satisfy the low similarity threshold in the event of a false positive. The score evaluator 432 may track and/or store the similarity scores that do not satisfy the low similarity threshold (e.g., store the network scores in database 110 of FIG. 1).

In some embodiments, over time, the score evaluator 432 generates a new network score cluster based on the stored network scores that did not satisfy the low similarity score threshold. Accordingly, the score evaluator 432 creates more clusters with more associated network states. For example, a cluster of network scores that did not satisfy low similarity scores may be associated with the network state of non-malicious activity, even though the similarity score determined by the model suite 421 may seem on its face to be associated with malicious activity on the network.

The score evaluator 432 may store the network scores that satisfied the low similarity score threshold but did not satisfy the high similarity score threshold. These network scores may be considered weak network scores that lack enough similarity with the corresponding network score cluster to immediately characterize that network score as part of the network score cluster. The score evaluator 432 may evaluate the weak network scores based on triggering criteria. Non-limiting examples of triggering criteria include: periodic weak network score evaluations, and a threshold number of stored weak network scores. In response to the score evaluator 432 identifying a triggering criterion, the score evaluator 432 may recalculate the similarity score of each of the weak network scores to the network score cluster associated with the weak network scores. The score evaluator 432 may update the network score cluster with the weak network scores in response to the similarity score satisfying a threshold. Additionally or alternatively, the score evaluator 432 may remove one or more weak network scores from the stored weak network scores.

The score evaluator 432 evaluates the network score 430 by evaluating the similarity of the network score 430 to clusters of network scores and comparing the similarity score to high similarity thresholds, low similarity thresholds, and/or optimal similarity thresholds associated with the network score cluster most similar to the network score 430. In this manner, the security operations software application 420 contextualizes the network score 430 determined by the model suite 421.

Referring back to FIG. 2, in step 212, the analytics server may display the network activity classification (e.g., network activity classification 440 determined by the score evaluator 432 in addition to, or instead of the network score 430 in FIG. 4). The network activity classification contextualizes the network score to facilitate a user (such as an administrator) in determining whether a high network score correlates to malicious activity, or whether a high network score is a false positive that does not necessarily indicate malicious activity. In addition to the network activity classification, the analytics server may display the network activity score (e.g., network activity score 330 determined by the model suite 321 in FIG. 3A), relevant features used in determining the network activity score (an above threshold number of authentications, a below threshold ISP origination, an average network activity score of the user generating the network activity, an average network activity score of one or more groups of similar users, and the like. Referring to FIGS. 1-4, an administrator using an administrator device 160 may receive a notification from the security operations software application 420 if the network activity score 430 satisfies one or more thresholds and/or the network activity classification 440 indicates a strong (or not strong) network activity score. Additionally or alternatively, a dashboard executed by the security operations software application 420 may update.

In step 214, the analytics server may perform one or more actions. Actions may include gathering more information (e.g., prompting one or more users for information, monitoring one or more users more closely by prioritizing monitoring of the one or more users), communicating one or more notifications to particular personnel (e.g., transmitting a flag/notification to a security analyst, escalating an incident to one or more security analysts, sending an email notifying a user of an issue), blocking access of one or more users to one or more systems (e.g., a server), spinning down one or more servers, etc. For example, based on the evaluated network activity score (e.g., the network activity classification 440 in FIG. 4) indicating that a high network activity score is a strong network activity score, the analytics server may dynamically provision the one or more users associated with the monitored network activity (e.g., network activity 410 in FIG. 4). Dynamically provisioning the one or more users includes modifying the access of the one or more users to one or more files/data. In one example, each user in the network has access to the data/files that the user is reasonably expected to need. Based on the network activity score and network activity classification, the user's access may be expanded or restricted. For example, the data associated with the monitored network activity that was scored/evaluated by the analytics server may be isolated from the rest of the network (e.g., sandboxed). Accordingly, at any given moment, each user has selective access to data/folders in the network, which increases the security of the network.

Additionally or alternatively, network activity scores (e.g., the network score(s) determined by the signature evaluator, baseline evaluator, model evaluator and/or score evaluator) may also be used for passwordless authentication (e.g., next generation authentication). In this example, a user may obtain access (or be blocked from access) and need to prove their credentials by re-authenticating, depending on the network activity score.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   monitoring, by a computer, network activity of a user having a baseline network activity corresponding to historic network activity of the user;
   executing, by the computer, a machine learning model to determine a network activity score indicating a likelihood of the network activity being malicious activity for the baseline network activity, the machine learning model having been previously trained based on malicious activity and corresponding baseline network activity;

generating, by the computer, a similarity score based upon a distance between the network activity score and a centroid of a cluster of network activity scores, the cluster of network activity scores formed based on similarities between one or more network activity scores;

evaluating, by the computer, the network activity score based on the similarity score; and displaying, by the computer, the network activity score.

2. The method according to claim 1, wherein evaluating, by the computer, the network activity score based on the similarity score further comprises:

determining, by the computer, that the network activity score is a strong network activity score based on the similarity score satisfying a high similarity threshold, the strong network activity score indicating that the network activity score is accurate.

3. The method according to claim 1, wherein evaluating, by the computer, the network activity score based on the similarity score further comprises:

determining, by the computer, that the network activity score is not a strong network activity score based on the similarity score not satisfying a low similarity threshold, the not strong network activity score indicating that the network activity score is not accurate.

4. The method according to claim 1, wherein the cluster of network activity scores is determined by associating one or more historic network activity scores with the centroid of the cluster of network activity scores.

5. The method according to claim 1, wherein the baseline network activity is based at least on average network activity of the user generating the network activity.

6. The method according to claim 5, wherein the baseline network activity is further based on at least on one of historic network activity of a group of similar users, average network activity of the group of similar users, historic network activity of another user, or average network activity of the another user.

7. The method according to claim 6, wherein the machine learning model is based on executing one or more computer models to evaluate the network activity using at least one of a binary decision, the baseline of network activity, or a statistical model.

8. The method according to claim 7, wherein determining the network activity score comprises mapping a difference between the network activity and the baseline network activity to the network activity score.

9. The method according to claim 7, wherein determining the network activity score comprises mapping a decision of the binary decision to the network activity score.

10. The method according to claim 7, wherein determining the network activity score comprises generating a weighted sum of one or more network activity scores determined by the one or more computer models.

11. A system comprising:

A server comprising a processor and a non-transitory computer-readable medium containing instructions that when executed by the processor cause the processor to preform operations comprising:

monitoring network activity of a user having a baseline network activity corresponding to historic network activity of the user;

executing a machine learning model to determine a network activity score indicating a likelihood of the network activity being malicious activity for the baseline network activity, the machine learning model having been previously trained based on malicious activity and corresponding baseline network activity;

generating a similarity score based upon a distance between the network activity score and a centroid of a cluster of network activity scores, the cluster of network activity scores formed based on similarities between one or more network activity scores;

evaluating the network activity score based on the similarity score; and displaying the network activity score.

12. The system according to claim 11, wherein evaluating the network activity score based on the similarity score further comprises:

determining that the network activity score is a strong network activity score based on the similarity score satisfying a high similarity threshold, the strong network activity score indicating that the network activity score is accurate.

13. The system according to claim 11, wherein evaluating the network activity score based on the similarity score further comprises:

determining that the network activity score is not a strong network activity score based on the similarity score not satisfying a low similarity threshold, the not strong network activity score indicating that the network activity score is not accurate.

14. The system according to claim 11, wherein the cluster of network activity scores is determined by associating one or more historic network activity scores with the centroid of the cluster of network activity scores.

15. The system according to claim 11, wherein the baseline network activity is based at least on average network activity of the user generating the network activity.

16. The system according to claim 15, wherein the baseline network activity is further based on at least on one of historic network activity of a group of similar users, average network activity of the group of similar users, historic network activity of another user, or average network activity of the another user.

17. The system according to claim 16, wherein the machine learning model is based on executing one or more computer models to evaluate the network activity using at least one of a binary decision, the baseline network activity, or a statistical model.

18. The system according to claim 17, wherein determining the network activity score comprises mapping a difference between the network activity and the baseline network activity to the network activity score.

* * * * *